(No Model.)
A. R. LEEDS.
ELECTRICAL APPARATUS FOR PURIFYING WATER.
No. 383,184. Patented May 22, 1888.
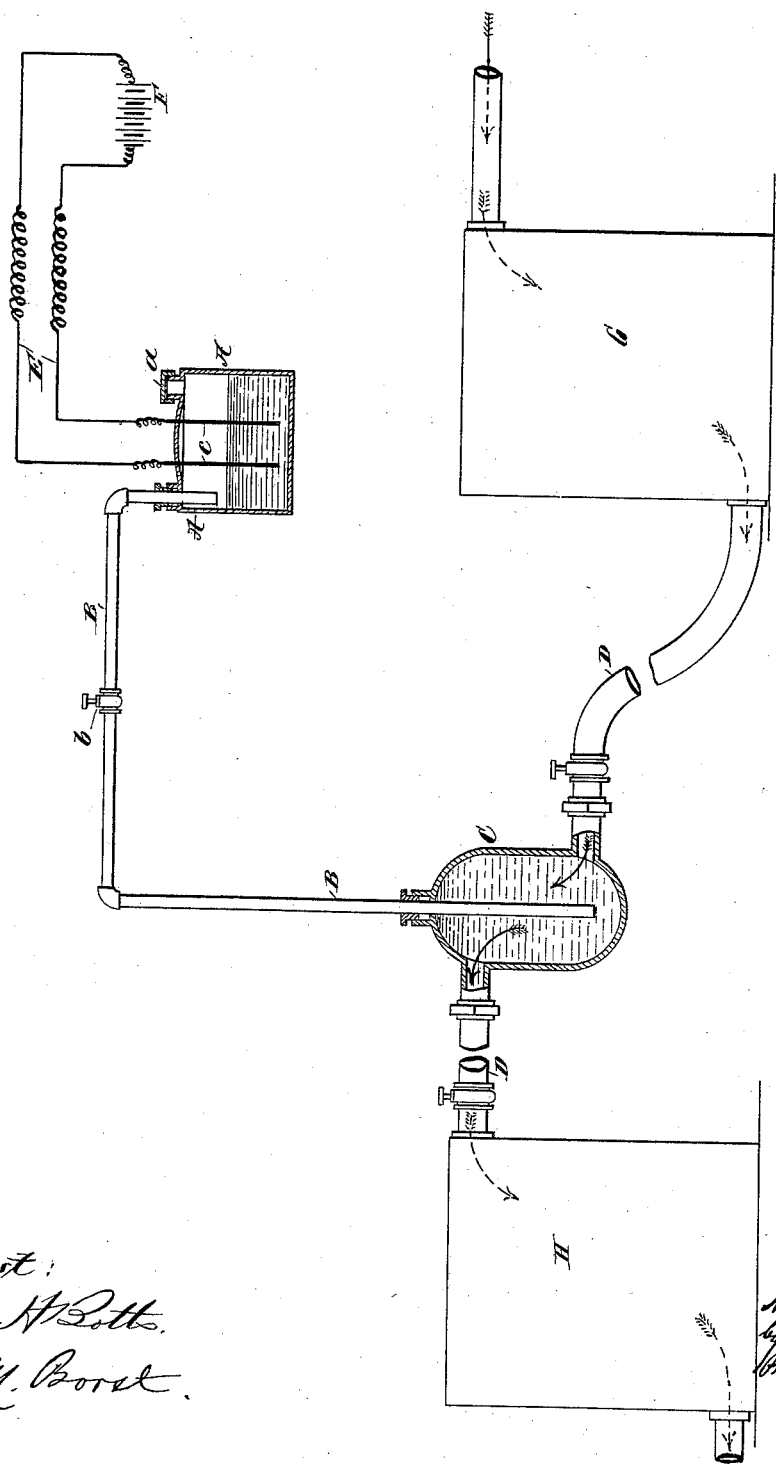

UNITED STATES PATENT OFFICE.

ALBERT R. LEEDS, OF HOBOKEN, NEW JERSEY.

ELECTRICAL APPARATUS FOR PURIFYING WATER.

SPECIFICATION forming part of Letters Patent No. 383,184, dated May 22, 1888.

Application filed September 19, 1887. Serial No. 250,068. (No model.)

*To all whom it may concern:*

Be it known that I, ALBERT R. LEEDS, a citizen of the United States, residing at Hoboken, county of Hudson, and State of New Jersey, have invented certain new and useful Improvements in Apparatus for Purifying Water, fully described and represented in the following specification and the accompanying drawing, forming a part of the same.

In the art of purifying water it has been found that many waters contain certain organic impurities, which it is highly important should be removed in order to render the water fit for drinking and many other uses, but which cannot be removed by ordinary mechanical filtering. In the treatment of waters containing impurities of this class many attempts have been made to purify the water by the use of chemicals, which acted either to precipitate the organic impurities or to reduce them to such condition that they could be readily removed by filtration.

I have discovered that the organic impurities which are contained in large quantities in many waters when in their natural condition, as well as in factory slop and sewage, can be readily and economically removed, so as to render the water pure and wholesome, by treating the water with the gases obtained by the decomposition of water containing an acid or salt in solution, the decomposition being effected by means of an electric current. The acid employed may be hydrochloric, nitric, phosphoric, chromic, or sulphuric; or the salts of these acids may be employed, or a mixture of these acids or salts or acids and salts may be employed. The best results are, however, obtained by the use of hydrochloric acid.

The present invention relates particularly to an apparatus for effecting the purification of water by means of gases generated as above stated, and as a full understanding of the invention can be best given by an illustration and a detailed description of the apparatus, all preliminary description will be omitted and a full description given, reference being had to the accompanying drawing, which illustrates by a diagrammatic section a simple form of the apparatus.

Referring to said drawing, it is to be understood that A represents a tank or receptacle containing the acid or salt solution referred to. This tank, which is of any suitable form and is provided with means, as the removable cap *a*, by which its contents can be replenished, communicates by a pipe, B, with a chamber, C, formed by an enlargement of the pipe D, through which the water to be treated flows. Entering the tank A, and immersed in the solution contained therein, are the terminals *c* of an electric circuit, E, which is supplied with suitable battery or other means of generating an electric current, as indicated at F.

The operation is as follows: The tank A being supplied with the acid or salt solution and the electric circuit E closed and the cock or valve *b* in the pipe B opened, the water in the tank A, containing the acid or salt, will be decomposed by the electric current, and the gases given off by this decomposition of the water will escape by the pipe B and enter the water, passing through the pipe D and chamber C. The gases thus entering the water will have the effect to destroy the organic impurities contained in the water, so that they will be precipitated or reduced to such a form or condition that they can be readily removed by passing the water through an ordinary filter.

Factory slops and other water containing a large amount of organic matter which cannot be removed by mechanical filtration, and even sewage, can by this means be rendered pure and wholesome. The necessary supply of gases for the purpose of carrying out the process can be readily produced in the manner described at a comparatively trifling expense.

In some cases the process can be rendered more economical by filtering the water previous to its treatment with the gases for the destruction of the organic matter. The matter contained in the water absorbs more or less of the gases, and when this matter is considerable—as, for example, in the case of factory slops and sewage—a much larger amount of the gases is required than would otherwise be necessary. By filtering the water, however, before its treatment with the gas, these impurities are removed and the consumption of gas is lessened. For this purpose the apparatus may be provided with a filter, G, of any ordinary form, through which the water passes before it enters the chamber C, and the apparatus may also embrace a second filter, H, through which the water will be passed after leaving the chamber C, and which will act to remove the organic impurities which have been destroyed by the action of the gas.

The apparatus, as herein illustrated, is organized so as to make the process continuous, and this, where water is to be purified in large quantities, will usually be desirable; but the operation may, if in any case it should be desirable to do so, be carried on intermittingly, and in such case a tank or vessel corresponding to the chamber C will be filled with water to be treated with the gas, which water will, after being treated, be drawn off and the tank again filled, and so on.

The process of purifying water by means of gases produced in the manner herein described is not herein claimed, as said process is claimed in my companion application filed September 15, 1887, Serial No. 249,762.

What I claim is—

1. The combination, with the closed tank A, for containing the acid or salt solution, of the pipe B, communicating with said tank and the body of water to be purified, and the terminals $c$ of the electric circuit, located in said tank in position to be in the solution, substantially as described.

2. The combination, with the filter G, of the closed tank A, for containing the acid or salt solution, the pipe B, communicating with the discharge of the filter, and the terminals $c$ of the electric circuit, located in said tank in position to be in the solution, substantially as described.

3. The combination, with the filters G H, of the tank A, for containing the acid or salt solution, the pipe B, communicating with said tank and with the pipe through which the water passes from one filter to the other, and the terminals $c$ of the electric circuit, located in said tank in position to be in the solution, substantially as described.

In testimony whereof I have hereunto set my hand in the presence of two subscribing witnesses.

ALBERT R. LEEDS.

Witnesses:
 RUDOLF GUDER,
 F. LUTHIN.